US011622405B2

(12) United States Patent
Cui et al.

(10) Patent No.: US 11,622,405 B2
(45) Date of Patent: *Apr. 4, 2023

(54) APPARATUS AND METHOD FOR MULTI-NETWORK CONNECTIVITY WITH A DYNAMIC NODE SELECTION

(71) Applicant: AT&T Intellectual Property I, L.P., Atlanta, GA (US)

(72) Inventors: Zhi Cui, Sugar Hill, GA (US); Hongyan Lei, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/359,741

(22) Filed: Jun. 28, 2021

(65) Prior Publication Data

US 2021/0329722 A1    Oct. 21, 2021

Related U.S. Application Data

(63) Continuation of application No. 16/369,651, filed on Mar. 29, 2019, now Pat. No. 11,083,032.

(51) Int. Cl.
*H04W 76/15* (2018.01)
*H04W 84/04* (2009.01)
*H04W 88/06* (2009.01)

(52) U.S. Cl.
CPC .......... *H04W 76/15* (2018.02); *H04W 84/042* (2013.01); *H04W 88/06* (2013.01)

(58) Field of Classification Search
None
See application file for complete search history.

(56) References Cited

U.S. PATENT DOCUMENTS

| 7,440,756 | B1 * | 10/2008 | Wang | H04W 48/20 |
| | | | | 455/436 |
| 11,083,032 | B2 * | 8/2021 | Cui | H04W 76/16 |
| 2014/0362750 | A1 * | 12/2014 | Song | H04W 52/0206 |
| | | | | 370/311 |
| 2015/0029999 | A1 * | 1/2015 | Horn | H04W 76/12 |
| | | | | 370/331 |
| 2016/0021592 | A1 * | 1/2016 | Vesely | H04W 36/0069 |
| | | | | 370/331 |
| 2017/0070902 | A1 * | 3/2017 | Fukuta | H04W 36/08 |

(Continued)

*Primary Examiner* — Lonnie V Sweet
(74) *Attorney, Agent, or Firm* — Guntin & Gust, PLC; Mark Wilinski

(57) ABSTRACT

Aspects of the subject disclosure may include, for example, connecting a user equipment to a first node of a first network to provide a service requested by the user equipment to the user equipment, obtaining a first measurement associated with the first node and a second measurement associated with a second node, responsive to the obtaining, detecting that the first measurement is less than a first threshold and the second measurement is greater than a second threshold, responsive to the detecting, identifying an application executed by the user equipment in obtaining the service, and responsive to determining that the application requires dual connectivity based on the identifying, commanding the user equipment to establish connectivity with the second node or a third node to provide at least a portion of the service. Other embodiments are disclosed.

20 Claims, 9 Drawing Sheets

(56) References Cited

U.S. PATENT DOCUMENTS

| | | | |
|---|---|---|---|
| 2017/0127217 A1* | 5/2017 | Miao | H04W 76/15 |
| 2017/0366313 A1* | 12/2017 | Rahman | H04W 56/00 |
| 2018/0020418 A1* | 1/2018 | Chandramouli | H04W 76/16 |
| 2018/0115921 A1* | 4/2018 | Chen | H04W 28/0257 |
| 2018/0332639 A1* | 11/2018 | Futaki | H04W 72/1284 |
| 2019/0037417 A1 | 1/2019 | Lei et al. | |
| 2019/0098606 A1* | 3/2019 | Sharma | H04W 76/15 |
| 2019/0174353 A1* | 6/2019 | Yilmaz | H04W 28/0278 |
| 2019/0254118 A1* | 8/2019 | Dao | H04L 67/141 |
| 2019/0357105 A1* | 11/2019 | Zhang | H04W 36/0072 |
| 2020/0178331 A1* | 6/2020 | Xu | H04W 76/16 |
| 2020/0221515 A1* | 7/2020 | Johansson | H04W 76/11 |
| 2020/0267753 A1* | 8/2020 | Adjakple | H04W 72/1226 |
| 2020/0314930 A1 | 10/2020 | Cui et al. | |
| 2021/0058831 A1* | 2/2021 | Sharma | H04W 28/0257 |

* cited by examiner

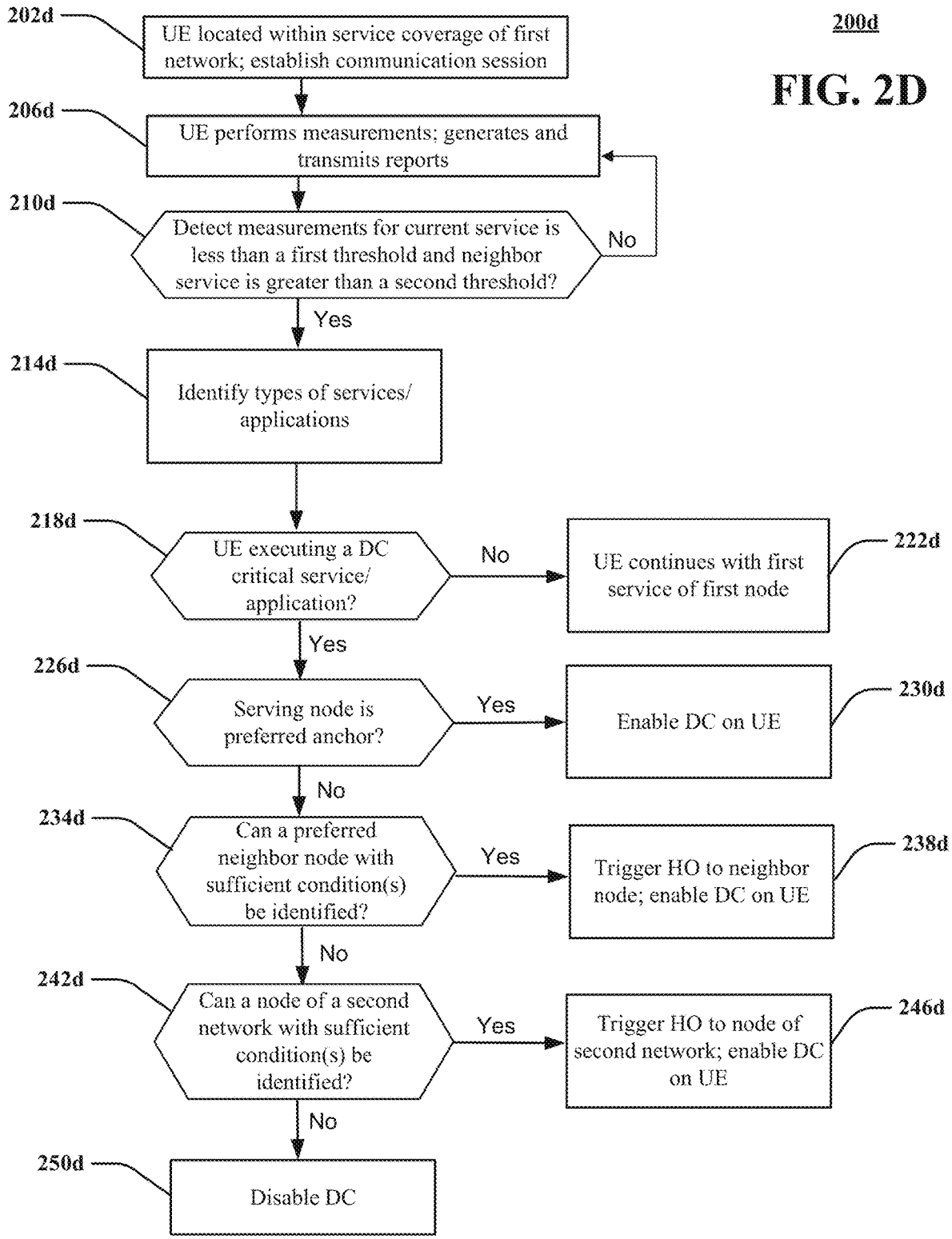

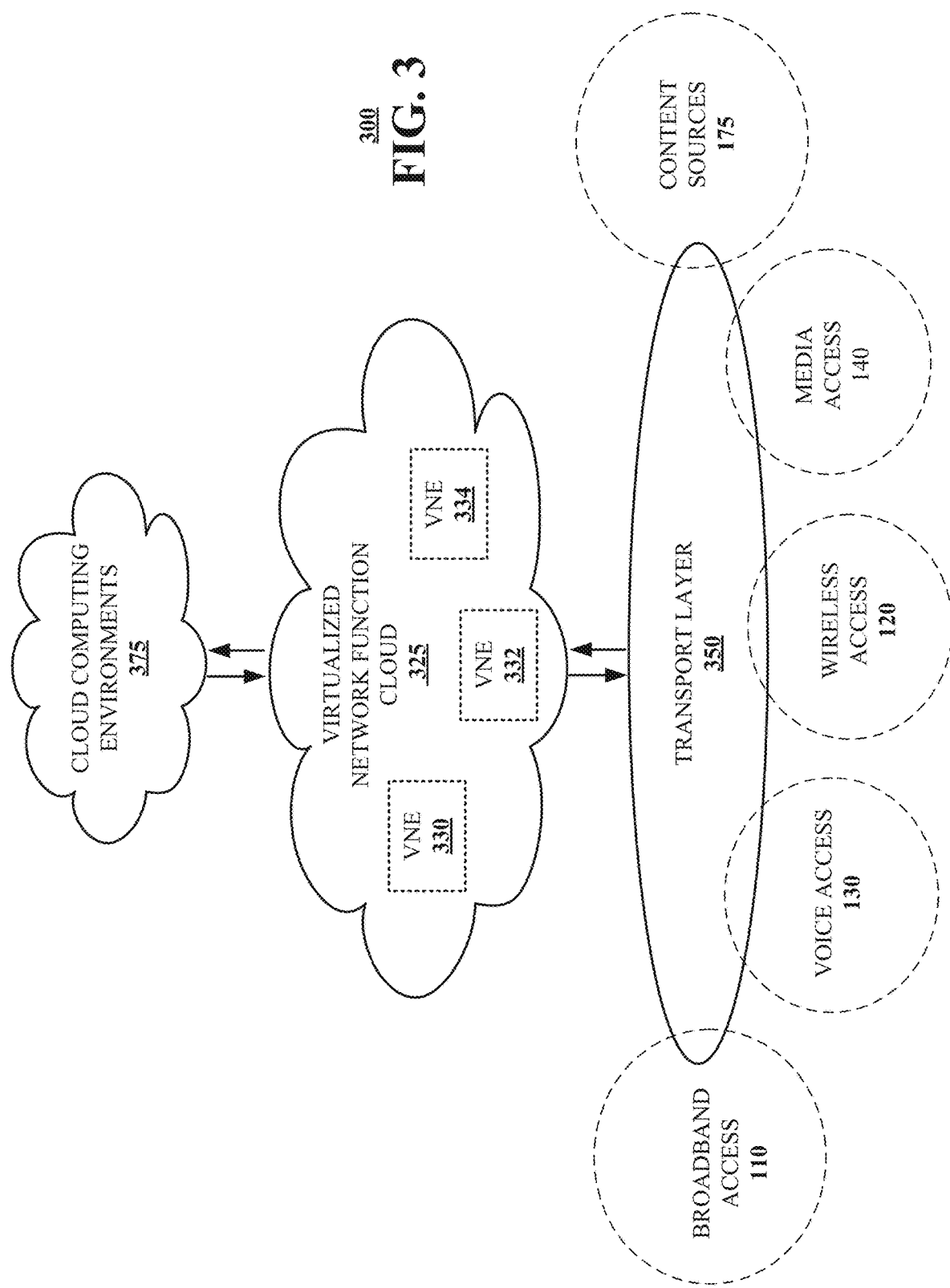

APPARATUS AND METHOD FOR MULTI-NETWORK CONNECTIVITY WITH A DYNAMIC NODE SELECTION

CROSS-REFERENCE TO RELATED APPLICATIONS

This application is a continuation of U.S. patent application Ser. No. 16/369,651, filed on Mar. 29, 2019. All sections of the aforementioned application are incorporated herein by reference in their entirety.

FIELD OF THE DISCLOSURE

The subject disclosure relates to an apparatus and method for multi-network connectivity with a dynamic node selection.

BACKGROUND

As the world becomes increasingly connected, there are opportunities to enhance a user experience with respect to a user equipment (UE). For example, a UE may be capable of simultaneous connectivity with respect to more than one network, such that traffic (e.g., data) can be simultaneously transmitted or received over links associated with each of the networks. In this manner, the UE may be able to leverage the availability of high throughput provided by the networks, as well as reliability, stability, and coverage associated with the networks.

A primary network node that the UE is connected to is frequently referred to as an anchor node. Depending on a variety of factors/conditions, a given network node may or might not be a good/appropriate candidate to serve as an anchor node.

BRIEF DESCRIPTION OF THE DRAWINGS

Reference will now be made to the accompanying drawings, which are not necessarily drawn to scale, and wherein:

FIG. 2D depicts an illustrative embodiment of a method in accordance with various aspects described herein.

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for identifying nodes that a communication device should be connected to. Other embodiments are described in the subject disclosure.

One or more aspects of the subject disclosure include connecting a user equipment to a first node of a first network to provide a service requested by the user equipment to the user equipment, obtaining a first measurement associated with the first node and a second measurement associated with a second node, responsive to the obtaining, detecting that the first measurement is less than a first threshold and the second measurement is greater than a second threshold, responsive to the detecting, identifying an application executed by the user equipment in obtaining the service, and responsive to determining that the application requires dual connectivity based on the identifying, commanding the user equipment to establish connectivity with the second node or a third node to provide the service.

One or more aspects of the subject disclosure include identifying a first preference level of a first processing system to serve as an anchor node, receiving a first message from a second processing system, wherein the first message includes a second preference level of the second processing system to serve as the anchor node, determining that an application executed by a communication device in receiving a service would benefit from dual connectivity with respect to a plurality of networks in an amount that is greater than a threshold, and responsive to the determining, enabling dual connectivity on the communication device such that the communication device is simultaneously connected to: one of the first processing system or the second processing system, and a third processing system, wherein the first processing system and the second processing system are associated with a first network of the plurality of networks, and wherein the third processing system is associated with a second network of the plurality of networks.

Figure 1:
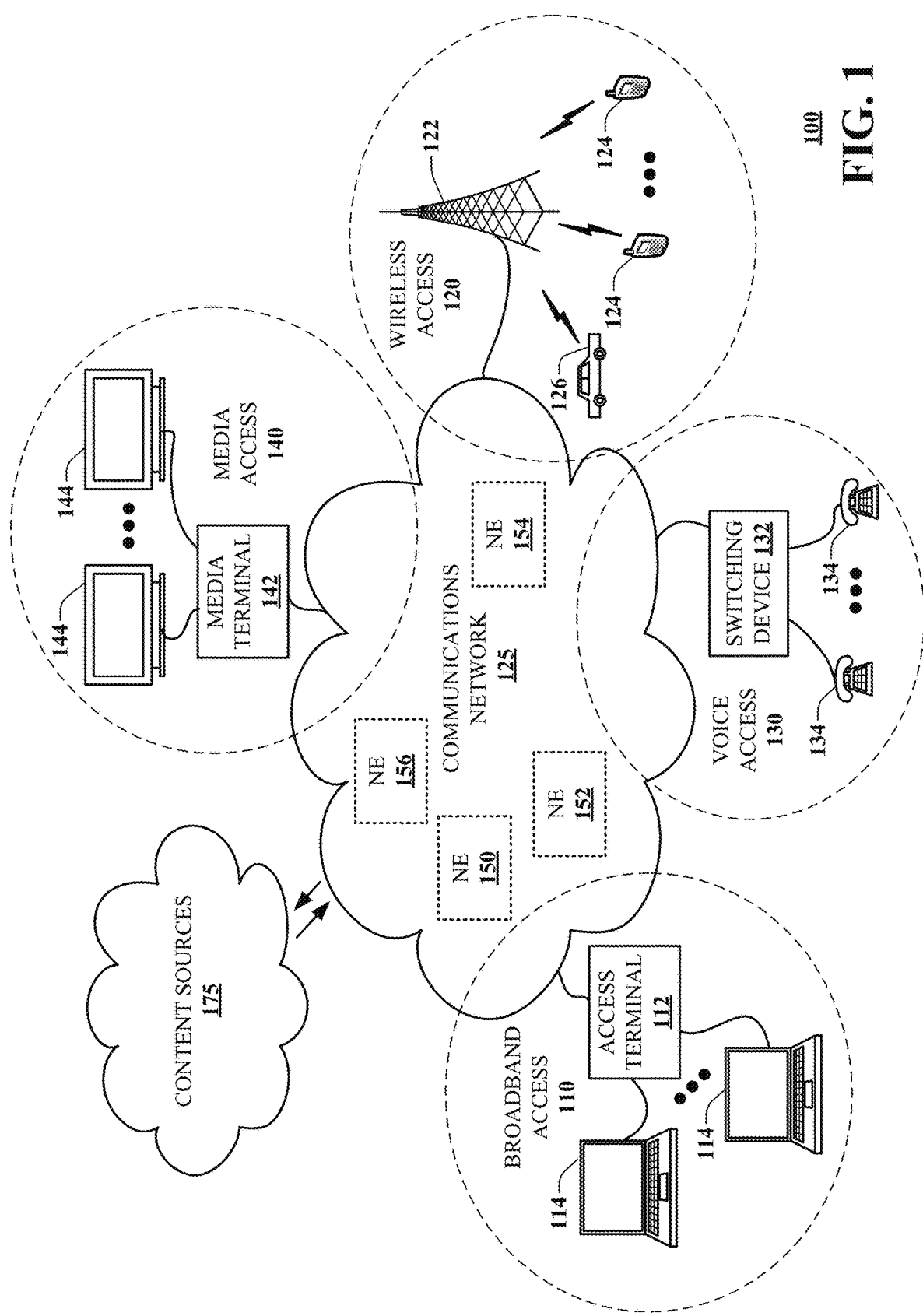
FIG. 1 is a block diagram illustrating an exemplary, non-limiting embodiment of a communications network in accordance with various aspects described herein.

One or more aspects of the subject disclosure include receiving, by a first processing system, a request for a service from a communication device to facilitate a communication session, receiving, by the first processing system, a measurement associated with a transmission by the first processing system, wherein the transmission facilitates the communication session via a first network, responsive to the receiving of the measurement, comparing, by the first processing system, a first preference level and a second preference level, wherein the first preference level indicates a preference of the first processing system to serve as an anchor node, wherein the second preference level indicates a preference of a second processing system to serve as the anchor node, and wherein the second preference level is different from the first preference level, and responsive to the comparing: causing, by the first processing system, the second processing system to serve as the anchor node during the communication session when the second preference level and the first preference level indicate that the second processing system is preferred as the anchor node, such that a first portion of the service is facilitated by the second processing system via the first network, and causing, by the first processing system, the first processing system to serve as the anchor node during the communication session when the second preference level and the first preference level indicate that the first processing system is preferred as the anchor node, such that the first portion of the service is facilitated by the first processing system via the first network. Referring now to FIG. 1, a block diagram is shown illustrating an example, non-limiting embodiment of a communications network 100 in accordance with various aspects described herein. For example, communications network 100 can facilitate in whole or in part connecting a user equipment to a first node of a first network to provide a service requested by the user equipment to the user equipment, obtaining a first measurement associated with the first node and a second measurement associated with a second node, responsive to the obtaining, detecting that the first measurement is less than a first threshold and the second measurement is greater than a second threshold, responsive to the detecting, identifying an application executed by the user equipment in obtaining the service, and responsive to determining that the application requires dual connectivity based on the identifying, commanding the user equipment to establish connectivity with the second node or a third node to provide the service. Communications network 100 can facilitate in whole or in part identifying a first preference level of a first processing system to serve as an anchor node, receiving a first message from a second processing system, wherein the first message includes a second preference level of the second processing system to serve as the anchor node, determining that an application executed by a communication device in receiving a service would benefit from dual connectivity with respect to a plurality of networks in an amount that is greater than a threshold, and responsive to the determining, enabling dual connectivity on the communication device such that the communication device is simultaneously connected to: one of the first processing system or the second processing system, and a third processing system, wherein the first processing system and the second processing system are associated with a first network of the plurality of networks, and wherein the third processing system is associated with a second network of the plurality of networks. Communications network 100 can facilitate in whole or in part receiving, by a first processing system, a request for a service from a communication device to facilitate a communication session, receiving, by the first processing system, a measurement associated with a transmission by the first processing system, wherein the transmission facilitates the communication session via a first network, responsive to the receiving of the measurement, comparing, by the first processing system, a first preference level and a second preference level, wherein the first preference level indicates a preference of the first processing system to serve as an anchor node, wherein the second preference level indicates a preference of a second processing system to serve as the anchor node, and wherein the second preference level is different from the first preference level, and responsive to the comparing: causing, by the first processing system, the second processing system to serve as the anchor node during the communication session when the second preference level and the first preference level indicate that the second processing system is preferred as the anchor node, such that a first portion of the service is facilitated by the second processing system via the first network, and causing, by the first processing system, the first processing system to serve as the anchor node during the communication session when the second preference level and the first preference level indicate that the first processing system is preferred as the anchor node, such that the first portion of the service is facilitated by the first processing system via the first network.

Referring to FIG. 1, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
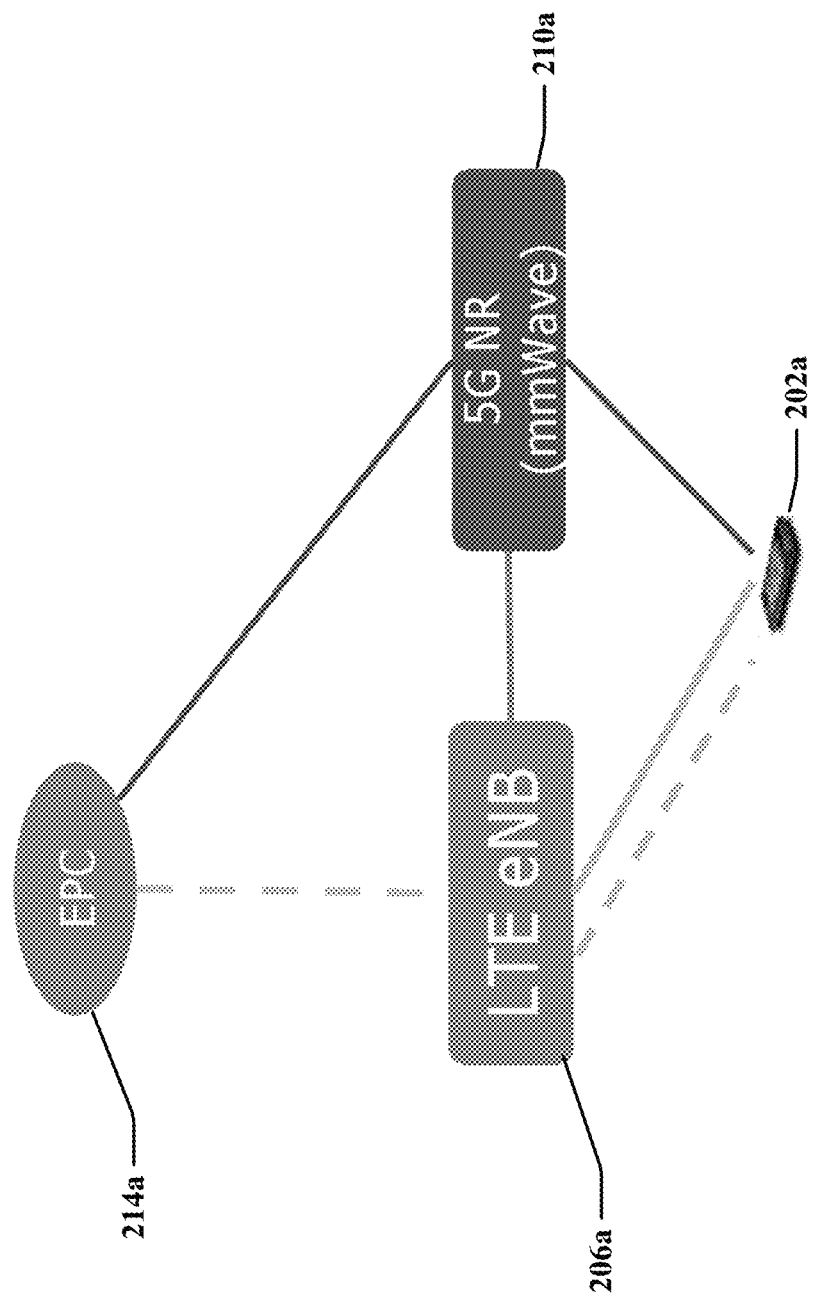
FIGS. 2A-2C are block diagrams illustrating example, non-limiting embodiments of systems functioning within the communication network of FIG. 1 in accordance with various aspects described herein.
Figure 2B:
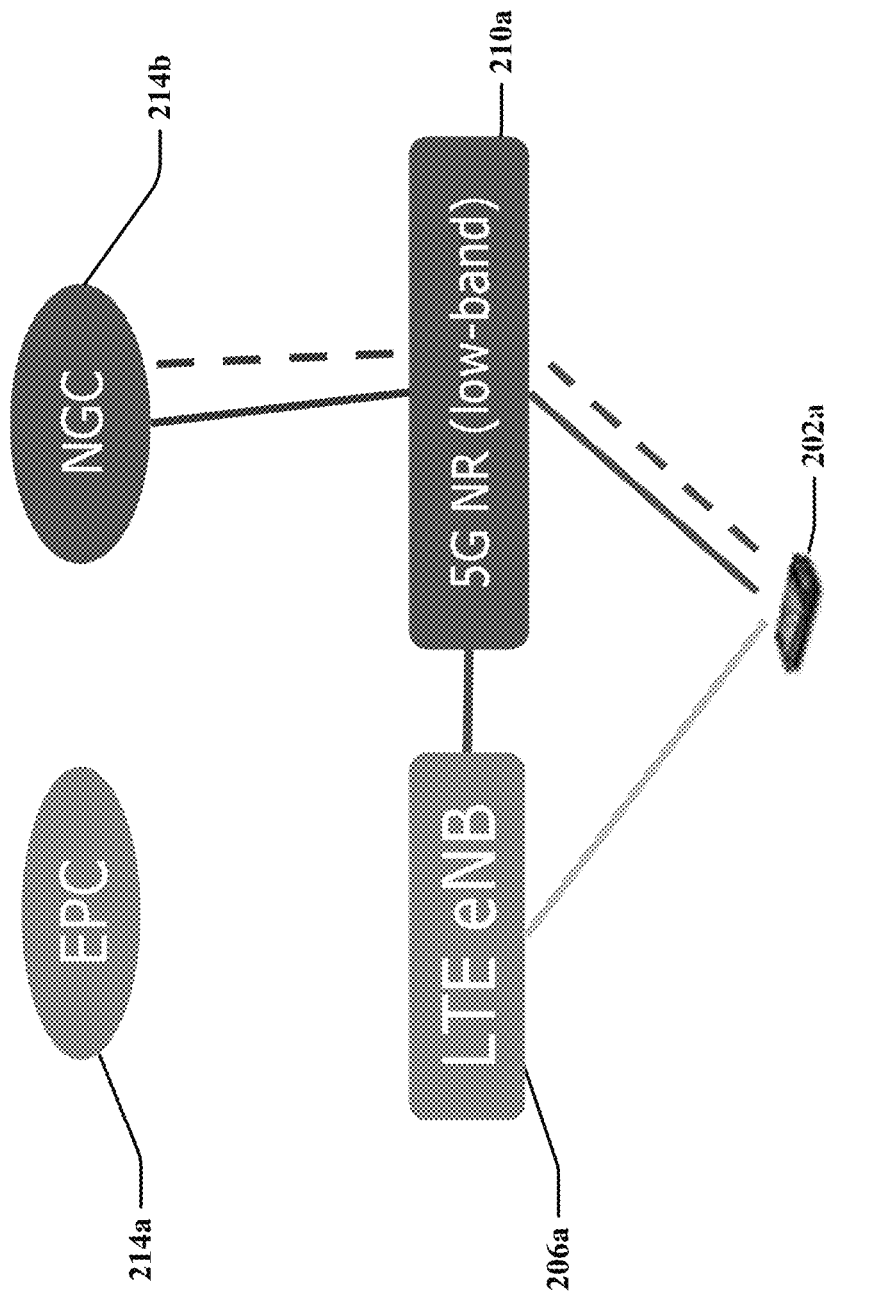

FIGS. 2A-2B are block diagrams illustrating example, non-limiting embodiments of systems 200a-200b functioning within the communication network 100 of FIG. 1 in accordance with various aspects described herein. While shown separately, in some embodiments aspects of a first of the systems (e.g., the system 200a) may be combined with aspects of a second of the systems (e.g., the system 200b).

Referring to FIG. 2A, a user equipment (UE) 202a may be operatively coupled to network infrastructure that may include a first network node 206a and a second network node 210a. As shown in FIG. 2A, the first network node 206a may correspond to a LTE eNB and the second network node may correspond to a 5G NR node. Each of the first network node 206a and the second network node 210a may be operatively coupled to a third node 214a, e.g., a core (EPC) node.

The system 200a may support dual connectivity (DC) with respect to the UE 202a, which is to say that the UE 202a may be simultaneously connected to a first network (e.g., a 4G network or an LTE network) supported by the first network node 206a and a second network (e.g., a 5G network) supported by the second network node 210a. To facilitate such dual connectivity, the UE 202a may first connect to the first network via a control plane (as represented by the dashed lines in FIG. 2A) associated with the first network, such that the first network node 206a serves as an anchor node. Thereafter, the UE 202a may connect to the second network node 210a. Data may be transmitted to, or received from, the UE 202a over a user/data plane (as represented by the solid lines connecting the entities in FIG. 2A). Conventionally, the third node 214a may be associated with the first network described above.

The dual connectivity described above, wherein the first network node 206a serves as an anchor node, may be particularly beneficial due to the stability/reliability that may be associated with the first network. For example, when the second network is initially being deployed, the second network may tend to be unstable/unreliable. Thus, the UE 202a may be able to leverage the stability/reliability of the coverage associated with the first network, while supplementing the coverage by obtaining access to high-speed throughput associated with the second network (e.g., via millimeter (mm) wave frequencies/bands associated with the second network).

As the second network matures (e.g., as the stability/reliability of the second network improves, potentially due at least in part to an expansion or improvement of resources associated with the second network), the second network node 210a may serve as an anchor node. Such a scenario is shown in FIG. 2B, wherein the UE 202a is shown as connected to a second network supported by the second network node 210a (and a fourth node 214b, e.g., a next generation core (NGC) node). Connection to the anchor node may be facilitated by a control plane (as represented by the dashed lines in FIG. 2B) of the second network operating at relatively low frequencies. Information (e.g., data) may be exchanged over data planes (as represented by the solid lines connecting the entities in FIG. 2B) of the networks. Thus, as shown in FIG. 2B, UE 202a connectivity with the first network/first network node 206a may be used to supplement the coverage provided by the second network/second network node 210a, in order to provide the UE 202a with additional throughput beyond what is obtained merely via the use of the second network.

Depending on a variety of factors, such as for example frequency bands utilized by the second network/second network node 206a, the second network node 206a may, or might not, be a good candidate to serve as an anchor node. For example, the frequency bands associated with (a center frequency of) 28 GHz and 39 GHz may be less than ideal due to their popularity, limited coverage, and/or dynamic/fast variation in radio frequency (RF) conditions/coverage.

To facilitate an optimal selection of an anchor node, a serving node may need to know the capability of a neighbor node. For example, if a neighbor node is more capable of serving as an anchor node, than the serving node may relinquish its role as anchor node to the neighbor node.

In order to enable a system (e.g., the systems 200a and 200b of FIGS. 2A and 2B) to prioritize and select an appropriate/preferred node as an anchor node (in conjunction with dual connectivity), one or more information elements may be provided/transmitted by a first node to nearby, neighbor nodes. The information element(s) may include an indication of whether the first node is capable of serving as an anchor node, and if so, a relative preference level for serving in the capacity as anchor node.

While the example described above referred to the first node transmitting the information element(s) to nearby nodes, each node of a system may provide/transmit information element(s) associated with that node to nearby neighbor nodes. In this respect, each node may obtain information element(s) associated with its neighbor nodes, such that an "intelligent system" may be established wherein each node possesses information about its neighbors.

The information element(s) exchanged between nodes may include information beyond just anchor-related information. For example, the information element(s) may include an indication of traffic loads, interference levels/information, types of applications or communication sessions supported by the nodes, frequency bands used or supported by the nodes, etc. This additional information may further enhance the intelligence associated with the system.

The information element(s) may be included as part of one or more signals or messages that may be exchanged between the nodes. The signals/messages may be exchanged in accordance with a schedule (e.g., may be exchanged periodically) and/or in response to an occurrence of one or more events. In this respect, networks and systems of the instant disclosure may be adaptive in nature and may respond to changes in operating conditions.

In some embodiments, the information element(s) may be incorporated as part of a table, such as for example a neighbor relation table (NRT). A NRT may be stored by one or more nodes, devices, components, etc. Table 1, shown below, represents an example of an NRT that may be stored by, e.g., a given node in some embodiments.

TABLE 1

Example NRT

| Neighbor Relation | No Remove | No HO | No X2 | 5G NR-LTE DC Preference |
|---|---|---|---|---|
| A | | | | 2 |
| B | X | | X | 0 |
| C | X | | | 1 |

The information shown in Table 1 above is illustrative. In some embodiments, some of the information associated with the NRT of Table 1 may be optional. In some embodiments, additional information not shown in Table 1 may be included.

As shown in the first column of Table 1, the NRT for the given node may include an identification of nearby neighbor nodes, e.g., a neighbor A, a neighbor B, and a neighbor C. Each of the neighbors A-C may have reported status/configuration information to the given node via one or more signals/messages as described above. The status/configuration information received from each of the neighbor nodes may be used to populate the various fields/parameters of the NRT table. These fields/parameters are described in further detail below.

The "No Remove" field may be used to indicate whether the given node can remove/delete the entry from the NRT when executing a function to, e.g., remove aged networks/nodes. For example, in Table 1 above the "No Remove" field is X'd off for neighbor nodes B and C, meaning that the entries for neighbors B and C cannot be removed from the NRT. Conversely, for neighbor node A the "No Remove" field is not X'd off (e.g., it is blank) in Table 1, meaning that the entry for neighbor node A can be removed from the NRT if other criteria/conditions are satisfied. As this example demonstrates, the "No Remove" field may be used to purge (stale or decommissioned) networks/nodes from a listing of neighbor networks/nodes, or analogously, to ensure preservation of (important or significant) networks/nodes in the listing.

The "No HO" field may be used to indicate whether the given node can handoff a communication session to the respective neighbor node. In the NRT of Table 1, the "No HO" field is blank for each of neighbor nodes A, B, and C, which means that the given node may handoff a communication session to any of nodes A, B, and C. The "No HO" field may be X'd off if, for example, a node is experiencing large loads and is incapable of supporting additional communication sessions.

The "No X2" field may be used to indicate whether the respective neighbor node A-C is incapable (or analogously, capable) of engaging in signaling/messaging on an X2 interface. For example, the "No X2" field is X'd off in Table 1 for neighbor node B, meaning that node B is not able to engage in signaling/messaging on an X2 interface. Conversely, the "No X2" field is blank for neighbor nodes A and C in Table 1, meaning that nodes A and C are able to engage in signaling/messaging on an X2 interface.

The "5G NR-LTE DC Preference" field may be used to indicate a (relative) preference level for a node in terms of that node serving as an anchor node. For example, in Table 1 above, the "5G NR-LTE DC Preference" field for neighbor node B is set to a value of zero (0), which may indicate that node B is not willing, or is unable, to serve as an anchor node. For example, node B may be operating at high frequency bands, e.g., a 28 GHz band or a 39 GHz band, such that node B may represent a poor choice for anchor node purposes.

In Table 1 above, the "5G NR-LTE DC Preference" field for neighbor node A is set to a value of two (2), which may indicate that node A is preferred for anchor node purposes. For example, the node A may be operating in accordance with a low frequency band associated with, e.g., 5G technology, may be (largely) supporting non-real time data/applications, and may be supporting/communicating with user equipment that is proximate a cell center associated with the node. In this respect, the node A may be lightly loaded, such that the node A can shoulder the burden/task of serving as an anchor node.

In Table 1 above, the "5G NR-LTE DC Preference" field for neighbor node C is set to a value of one (1), which may indicate that node C is able to serve as an anchor node, but is not in as good a position to do so as node A. For example, given the relative values for the "5G NR-LTE DC Preference" field shown in Table 1, the node C may serve as a fallback node for anchor node purposes in the event that node A fails in such a capacity. In an example embodiment, the value of one (1) in the "5G NR-LTE DC Preference" field (for node C) may be associated with the node C utilizing a low frequency band (in 5G NR) and node C being capable of processing, e.g., 5G NR-LTE dual connectivity (DC) traffic.

While the "5G NR-LTE DC Preference" field was described above in connection with Table 1 as supporting three levels (e.g., levels 0, 1, and 2), in some embodiments more than three levels may be used. For example, a scale of zero (0) through nine (9) may be used to provide for finer resolution as to preference/capability levels for serving as an anchor node (relative to a scale of zero through two).

As described above, information element(s) (e.g., the information/parameters of the fields described above in association with Table 1) may be communicated as part of one or more signals or messages. Such signals/messages may conform to one or more standards, protocols, specifications, etc. In relation to the Third Generation Partnership Project (3GPP), one or more of the information elements may be included therewith. For example, one or more of the information elements may be included as part of, e.g., technical specification (TS) 36.300 and/or TS 38.423 (section 9.1.3.4 and/or section 9.2.2.13).

Figure 2C:
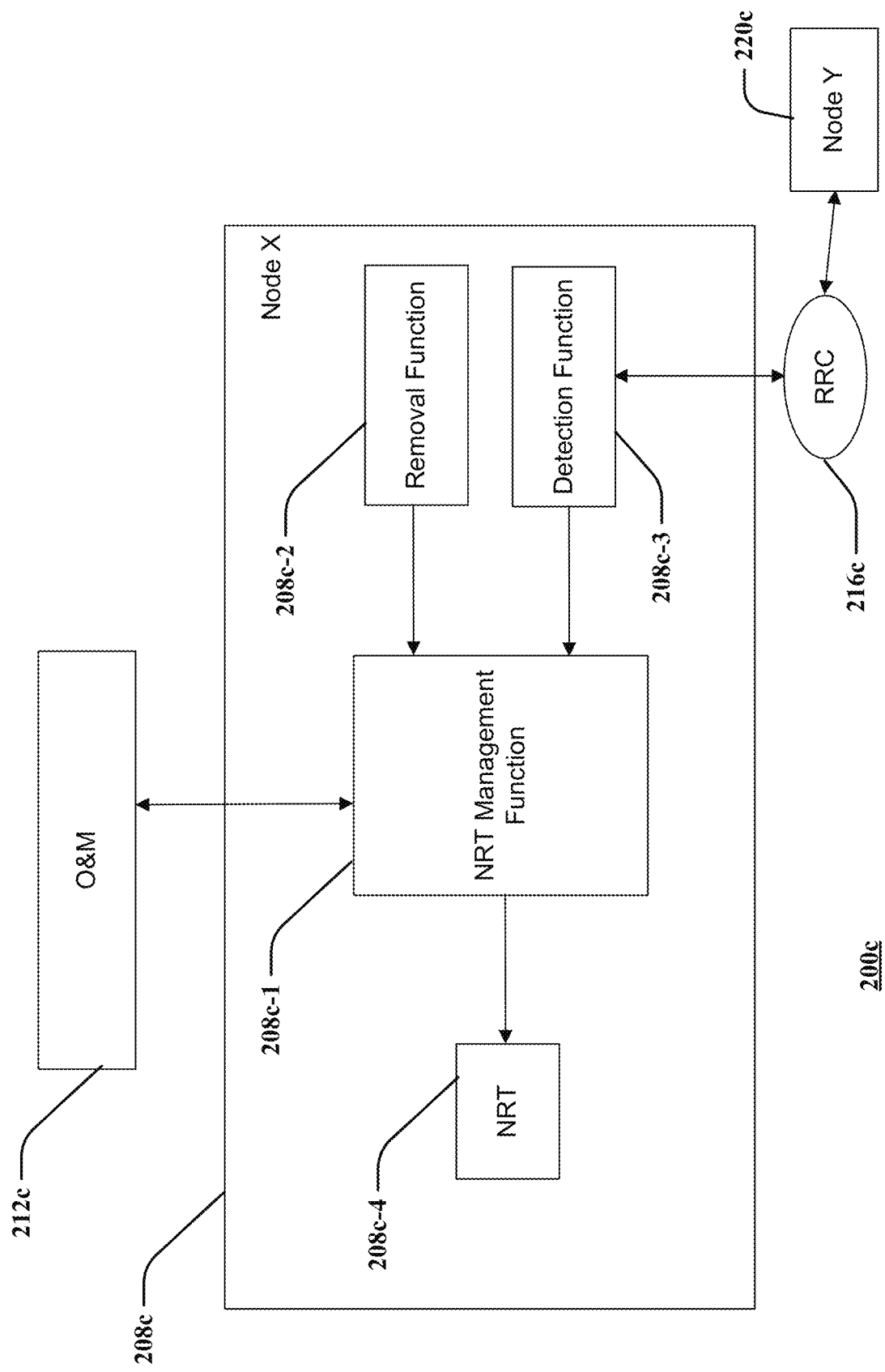

Referring now to FIG. 2C, a system 200c in accordance with one or more aspects of this disclosure is shown. The system 200c may be operatively coupled to, or overlaid upon, one or more of the systems 200a and 200b described above. In some embodiments, the system 200c may include a node X 208c, an operations & management (O&M) element/device 212c, and a radio resource controller (RRC) 216c.

The node X 208c may be operatively coupled to the O&M 212c. For example, a NRT management function 208c-1 of the node X 208c may generate and transmit one or more reports to the O&M 212c. The reports may include information regarding neighbor relations for the node X 208c. The O&M 212c may process the reports provided by the node X 208c (e.g., provided by the NRT management function 208c-1) and may send commands/instructions to the node X 208c (e.g., the NRT management function 208c-1) to add, delete, and/or modify neighbor relation information. In this respect, the O&M 212c may be used to provide higher-level network management/command capabilities, alleviating the node X 208c of having to provide for such management. Alternatively, or in addition thereto, the node X 208c-2 may include a removal function 208c-2 and/or a detection function 208c-3 that may provide inputs to the NRT management function 208c-1 to facilitate management of a NRT 208c-4 generated by the node X 208c (e.g., by the NRT management function 208c-1). For example, the removal function 208c-2 may provide inputs that instruct the NRT management function 208c-1 to remove a neighbor from the NRT 208c-4, and the detection function 208c-3 may provide inputs that instruct the NRT management function 208c-1 to add a neighbor to the NRT 208c-4. For example, the detection function 208c-3 may generate requests directed to the RRC 216c, and the RRC 216c may respond to those requests with one or more reports that identify new neighbor nodes (e.g., node Y 220c) that may have been added to/provisioned as part of the system 200c.

Referring now to FIG. 2D, an illustrative embodiment of a method 200d in accordance with various aspects described herein is depicted. The method 200d is described below in conjunction with one or more of the systems 200a-200c described above. One skilled in the art will appreciate, based on a review of this disclosure, that aspects of the method 200d may be executed, implemented, and/or practiced in conjunction with any number or type of system, device, and/or component.

In block 202d, a UE (e.g., the UE 202a of the systems 200a and 200b) may be located within a service coverage of a first network (e.g., a 5G NR network). As part of block 202d, the UE may establish a communication session with a first node (e.g., the node 210a of the systems 200a and 200b) of that first network. For example, as part of block 202d, a connection between the UE and the first node may be established, potentially in response to a request for service provided by the UE.

In block 206d, the UE may perform measurements. For example, the UE may perform measurements of downlink signals associated with the first network and/or a second network (e.g., a 4G/LTE network). As part of block 206d, the UE may transmit the measurements (potentially as part of one or more reports/signals/messages generated by the UE) to the first node of the first network (or another node); the measurements may be received by that first node (or the another node). The measurements may be based on, or include, one or more metrics, such as for example an identification of a signal-to-noise ratio (SNR), a signal-to-interference plus noise ratio (SINR), etc.

In block 210d, a determination/detection may be made, based at least in part on the measurements associated block 206d, whether the measurements associated with the service provided by the first node of the first network is less than a first threshold and that (measurements associated with) a service provided by a second node (e.g., a neighbor node of the first node) of the first network is greater than a second threshold (where the second threshold may be the same as, or different from, the first threshold). If that condition is not satisfied (e.g., the "no" path is taken from block 210d), flow may proceed from block 210d to block 206d. The flow from block 210d to block 206d may establish a loop, whereby the measurements associated with the first node and the second node of the first network continue to be monitored. Otherwise, if the condition is satisfied (e.g., the "yes" path is taken from block 210d), flow may proceed from block 210d to block 214d.

In block 214d, a type of service or application that the UE is receiving or is executing may be identified. The identification of block 214d may be based at least in part on the type of communication session (e.g., voice, data, video, audio, etc.) established as part of block 202d.

In block 218d, a determination may be made, based on the identification of block 214, whether the service or application that the UE is receiving or is executing is considered to be a dual connectivity (DC) critical service or application. A service/application may be considered to be critical if, e.g., the service/application is of sufficient importance (e.g., is being used in conjunction with a performance of a medical procedure), if the UE is being guaranteed a particular level of quality of service (QoS) under a contract, if the user experience would degrade below a threshold in the absence of DC, etc. As an illustrative example, an email application might not be considered a critical application since a user may generally be insensitive as to whether an email is transmitted or received at 9:00 AM or 9:01 AM. On the other hand, a streaming video application may be considered to be a critical application because excessive buffering delays and/or pixilation in the presented video may significantly degrade the user experience. Whether a particular service or application is considered to be DC critical may be based on experience, testing, user feedback/surveys, etc.

If, in block 218d, it is determined that the service/application is not DC critical (e.g., the "no" path is taken from block 218d), flow may proceed from block 218d to block 222d. Otherwise, it is determined that the service/application is DC critical (e.g., the "yes" path is taken from block 218d) and flow may proceed from block 218d to block 226d.

In block 222d, the UE may continue to receive service via the first network/first node as established in block 202d.

In block 226d, a determination may be made whether the first node (of block 202d) has a preferred status (or, analogously, a highest level of status or a level of status that exceeds a threshold in the context of the description provided above) in respect of serving as an anchor node. If so (e.g., the "yes" path is taken from block 226d), flow may proceed from block 226d to block 230d. Otherwise (e.g., the "no" path is taken from block 226d), flow may proceed from block 226d to block 234d.

In block 230d, dual connectivity (DC) may be enabled on the UE, potentially in response to a transmission of an instruction/command to the UE to enable DC. For example, as part of block 230d, the first node (of block 202d) of the first network may serve as an anchor node and the UE may connect to another node, such as for example a third node that is associated with a second network (e.g., a 4G/LTE network).

In block 234d, a determination may be made whether a neighbor node (such as for example the second node described above in conjunction with block 210d) that may be identified has an elevated status/level (e.g., a status of preferred) in terms of serving in the capacity of anchor node. As part of block 234d, a determination may be made whether that neighbor node satisfies specified conditions (e.g., is experiencing load in an amount that is less than a threshold, has sufficient uplink and/or downlink capacity, has sufficient amounts of available communications channels/frequencies/bands, has sufficient transmission power to communicate with the UE, etc.). If the determination of block 234d is answered in the affirmative (e.g., the "yes" path is taken out of block 234d), flow may proceed from block 234d to block 238d. Otherwise (e.g., the "no" path is taken out of block 234d), flow may proceed from block 234d to block 242d.

In block 238d, a handover/handoff of the communication session (of block 202d) may be triggered/initiated from the first node (of block 202d) to the neighbor node identified in block 234d. As part of block 238d, the UE may be instructed/commanded to establish DC with a third node of a second network in the manner described above with respect to block 230d. Stated slightly differently, in some embodiments block 238d may incorporate aspects of block 230d, whereby the neighbor node (of the first network) of block 234d serves as an anchor node and the UE connects to the third node (of the second network) to supplement the bandwidth/throughput that is available when the neighbor node is the anchor node.

In block 242d, a determination may be made whether another node (such as for example the third node described above in conjunction with block 230d and/or block 238d) of the second network can be identified for serving in the capacity of anchor node. As part of block 242d, a determination may be made whether the another node satisfies specified conditions (e.g., is experiencing load in an amount that is less than a threshold, has sufficient uplink and/or downlink capacity, has sufficient amounts of available communications channels/frequencies/bands, has sufficient transmission power to communicate with the UE, etc.). If the determination of block 242d is answered in the affirmative (e.g., the "yes" path is taken out of block 242d), flow may proceed from block 242d to block 246d. Otherwise (e.g., the "no" path is taken out of block 242d), flow may proceed from block 242d to block 250d.

In block 246d, a handover/handoff of the communication session (of block 202d) may be triggered/initiated from the first node (of block 202d) to the another node identified in block 242d, such that the another node becomes the anchor node. As part of block 242d, the UE may be instructed/commanded to establish DC with first node of the first network in a manner similar to that described above with respect to block 230d and block 238d. Stated slightly differently, in some embodiments block 246d may incorporate aspects of block 230d and/or block 238d, whereby the another node (of the second network) of block 242d serves as the anchor node and the UE connects (or remains connected) to the first node (of the first network) to supplement the bandwidth/throughput that is available when the another node is the anchor node.

In block 250d, the UE may be instructed/commanded to disable DC. As part of (the transition from block 242d to) block 250d, the UE may continue to receive service via the first node (of the first network) as obtained in block 202d, with the understanding that the service obtained as part of block 250d may be spotty, prone to errors or delays, etc.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Aspects of the disclosure may be applied at one or more levels of abstraction. For example, aspects of the disclosure may be applied at a system level, a network level, a device level, a component level, etc. While some of the examples set forth above related to nodes, aspects of the disclosure may be applied in relation to a service/coverage area. For example, aspects of the disclosure may be applied in relation to one or more cells of one or more networks.

Aspects of the disclosure may be used to select, establish, and/or modify which node of a plurality of nodes serves in a capacity of anchor node. In some embodiments, an anchor node may be responsible for determining whether the anchor node will continue in the capacity of anchor node or delegate the role/responsibility of anchor node to another node. One or more thresholds may be established and/or modified for determining which node of a plurality of nodes may serve as an anchor node. The thresholds may have hysteresis or bias applied to them to avoid repetitive switching of the role of anchor node between nodes. In this manner, power dissipation by the UE (e.g., depletion of battery power available at the UE) may be reduced (e.g., minimized) while also avoiding excessive signaling taking place amongst network infrastructure.

Aspects of the disclosure may be applied in connection with one or more signals or messages, such as for example a peer-to-peer framework/client (e.g., XnAP) message. Aspects of the disclosure may be integrated with a self-organizing network (SON) to provide network automation and traffic optimization benefits.

While some of the examples described herein pertain to UE, aspects of the disclosure may be applied in connection with any number or type of device. For example, aspects of the disclosure may be applied in connection with Internet of Things (IoT) devices, smart appliances, edge devices, gateways, routers, end terminal devices, etc. In some embodiments, such devices may be operative on the basis of user input. In some embodiments, these devices may be operative even in the absence of user input(s).

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of the systems 200a-200c, and the method 200d presented in FIG. 1 and FIGS. 2A-2D. For example, virtualized communication network 300 can facilitate in whole or in part connecting a user equipment to a first node of a first network to provide a service requested by the user equipment to the user equipment, obtaining a first measurement associated with the first node and a second measurement associated with a second node, responsive to the obtaining, detecting that the first measurement is less than a first threshold and the second measurement is greater than a second threshold, responsive to the detecting, identifying an application executed by the user equipment in obtaining the service, and responsive to determining that the application requires dual connectivity based on the identifying, commanding the user equipment to establish connectivity with the second node or a third node to provide the service. Virtualized communication network 300 can facilitate in whole or in part identifying a first preference level of a first processing system to serve as an anchor node, receiving a first message from a second processing system, wherein the first message includes a second preference level of the second processing system to serve as the anchor node, determining that an application executed by a communication device in receiving a service would benefit from dual connectivity with respect to a plurality of networks in an amount that is greater than a threshold, and responsive to the determining, enabling dual connectivity on the communication device such that the communication device is simultaneously connected to: one of the first processing system or the second processing system, and a third processing system, wherein the first processing system and the second processing system are associated with a first network of the plurality of networks, and wherein the third processing system is associated with a second network of the plurality of networks. Virtualized communication network 300 can facilitate in whole or in part receiving, by a first processing system, a request for a service from a communication device to facilitate a communication session, receiving, by the first processing system, a measurement associated with a transmission by the first processing system, wherein the transmission facilitates the communication session via a first network, responsive to the receiving of the measurement, comparing, by the first processing system, a first preference level and a second preference level, wherein the first preference level indicates a preference of the first processing system to serve as an anchor node, wherein the second preference level indicates a preference of a second processing system to serve as the anchor node, and wherein the second preference level is different from the first preference level, and responsive to the comparing: causing, by the first processing system, the second processing system to serve as the anchor node during the communication session when the second preference level and the first preference level indicate that the second processing system is preferred as the anchor node, such that a first portion of the service is facilitated by the second processing system via the first network, and causing, by the first processing system, the first processing system to serve as the anchor node during the communication session when the second preference level and the first preference level indicate that the first processing system is preferred as the anchor node, such that the first portion of the service is facilitated by the first processing system via the first network.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
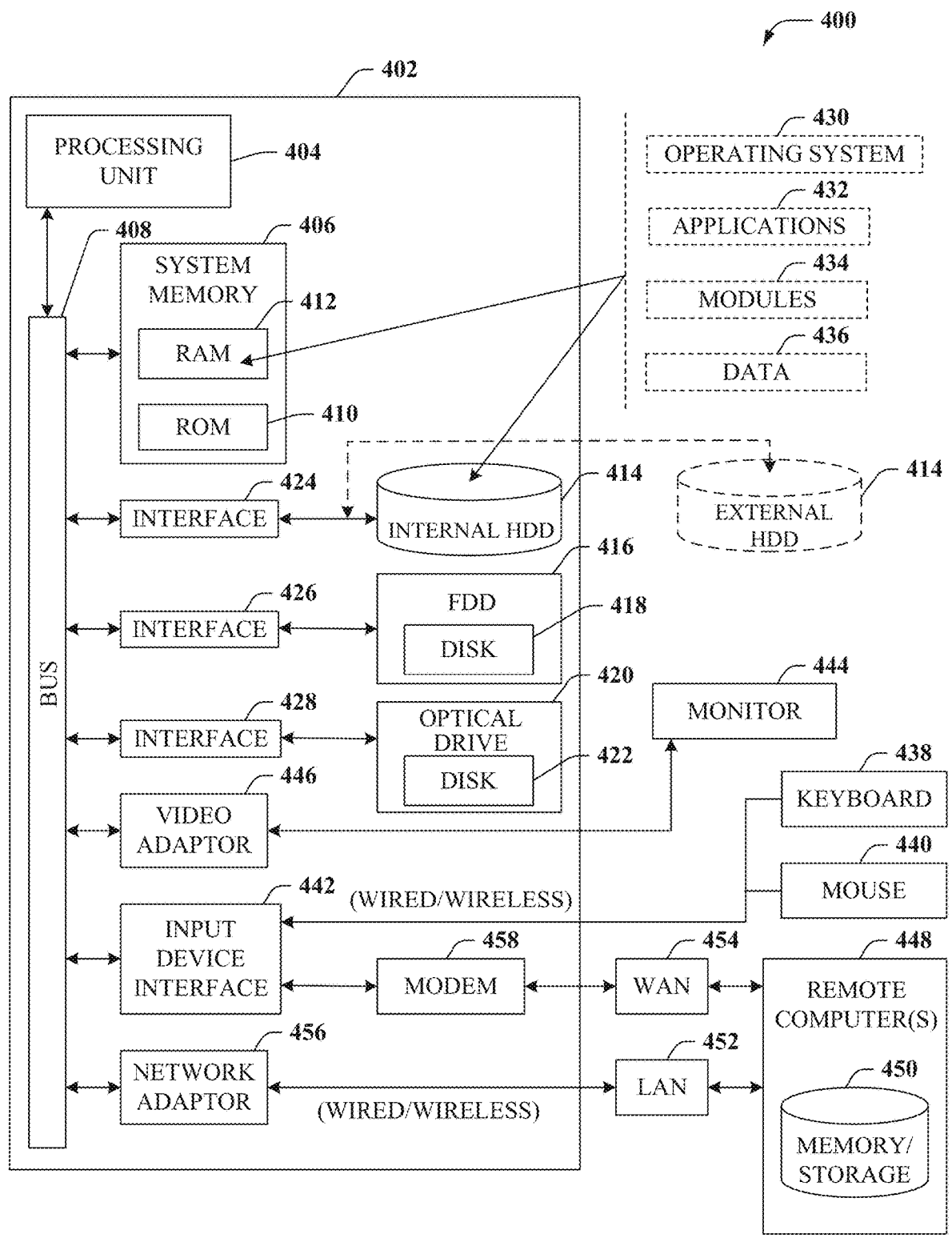
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part connecting a user equipment to a first node of a first network to provide a service requested by the user equipment to the user equipment, obtaining a first measurement associated with the first node and a second measurement associated with a second node, responsive to the obtaining, detecting that the first measurement is less than a first threshold and the second measurement is greater than a second threshold, responsive to the detecting, identifying an application executed by the user equipment in obtaining the service, and responsive to determining that the application requires dual connectivity based on the identifying, commanding the user equipment to establish connectivity with the second node or a third node to provide the service. Computing environment 400 can facilitate in whole or in part identifying a first preference level of a first processing system to serve as an anchor node, receiving a first message from a second processing system, wherein the first message includes a second preference level of the second processing system to serve as the anchor node, determining that an application executed by a communication device in receiving a service would benefit from dual connectivity with respect to a plurality of networks in an amount that is greater than a threshold, and responsive to the determining, enabling dual connectivity on the communication device such that the communication device is simultaneously connected to: one of the first processing system or the second processing system, and a third processing system, wherein the first processing system and the second processing system are associated with a first network of the plurality of networks, and wherein the third processing system is associated with a second network of the plurality of networks. Computing environment 400 can facilitate in whole or in part receiving, by a first processing system, a request for a service from a communication device to facilitate a communication session, receiving, by the first processing system, a measurement associated with a transmission by the first processing system, wherein the transmission facilitates the communication session via a first network, responsive to the receiving of the measurement, comparing, by the first processing system, a first preference level and a second preference level, wherein the first preference level indicates a preference of the first processing system to serve as an anchor node, wherein the second preference level indicates a preference of a second processing system to serve as the anchor node, and wherein the second preference level is different from the first preference level, and responsive to the comparing: causing, by the first processing system, the second processing system to serve as the anchor node during the communication session when the second preference level and the first preference level indicate that the second processing system is preferred as the anchor node, such that a first portion of the service is facilitated by the second processing system via the first network, and causing, by the first processing system, the first processing system to serve as the anchor node during the communication session when the second preference level and the first preference level indicate that the first processing system is preferred as the anchor node, such that the first portion of the service is facilitated by the first processing system via the first network.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
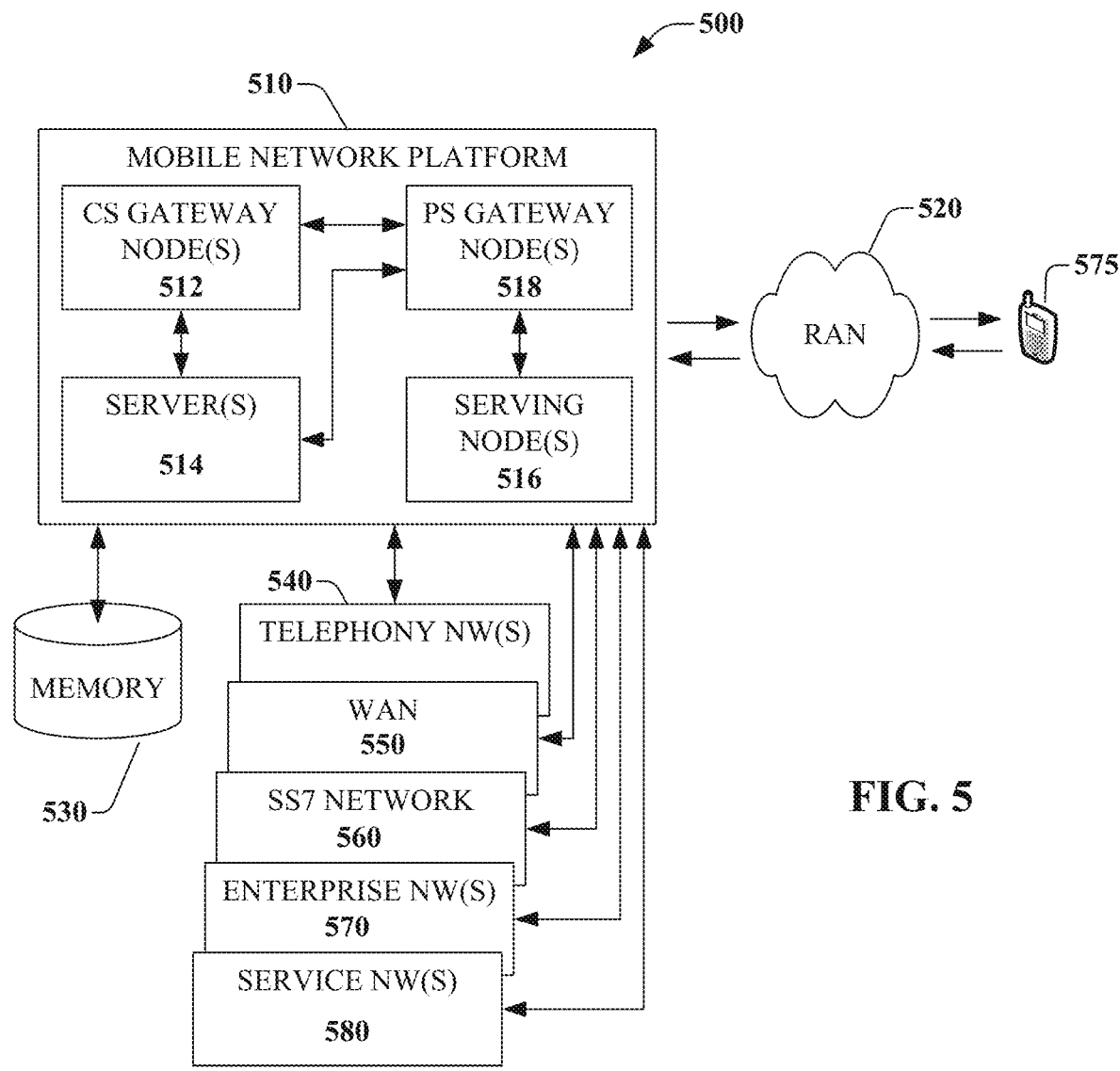
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part connecting a user equipment to a first node of a first network to provide a service requested by the user equipment to the user equipment, obtaining a first measurement associated with the first node and a second measurement associated with a second node, responsive to the obtaining, detecting that the first measurement is less than a first threshold and the second measurement is greater than a second threshold, responsive to the detecting, identifying an application executed by the user equipment in obtaining the service, and responsive to determining that the application requires dual connectivity based on the identifying, commanding the user equipment to establish connectivity with the second node or a third node to provide the service. Platform 510 can facilitate in whole or in part identifying a first preference level of a first processing system to serve as an anchor node, receiving a first message from a second processing system, wherein the first message includes a second preference level of the second processing system to serve as the anchor node, determining that an application executed by a communication device in receiving a service would benefit from dual connectivity with respect to a plurality of networks in an amount that is greater than a threshold, and responsive to the determining, enabling dual connectivity on the communication device such that the communication device is simultaneously connected to: one of the first processing system or the second processing system, and a third processing system, wherein the first processing system and the second processing system are associated with a first network of the plurality of networks, and wherein the third processing system is associated with a second network of the plurality of networks. Platform 510 can facilitate in whole or in part receiving, by a first processing system, a request for a service from a communication device to facilitate a communication session, receiving, by the first processing system, a measurement associated with a transmission by the first processing system, wherein the transmission facilitates the communication session via a first network, responsive to the receiving of the measurement, comparing, by the first processing system, a first preference level and a second preference level, wherein the first preference level indicates a preference of the first processing system to serve as an anchor node, wherein the second preference level indicates a preference of a second processing system to serve as the anchor node, and wherein the second preference level is different from the first preference level, and responsive to the comparing: causing, by the first processing system, the second processing system to serve as the anchor node during the communication session when the second preference level and the first preference level indicate that the second processing system is preferred as the anchor node, such that a first portion of the service is facilitated by the second processing system via the first network, and causing, by the first processing system, the first processing system to serve as the anchor node during the communication session when the second preference level and the first preference level indicate that the first processing system is preferred as the anchor node, such that the first portion of the service is facilitated by the first processing system via the first network.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
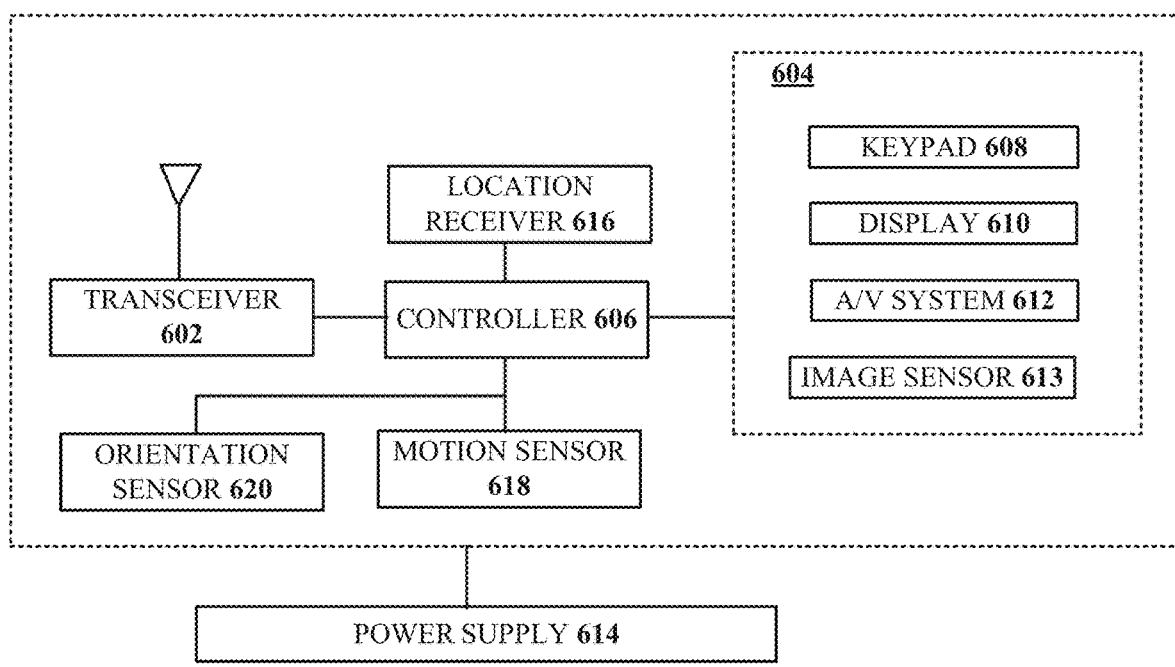
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part connecting a user equipment to a first node of a first network to provide a service requested by the user equipment to the user equipment, obtaining a first measurement associated with the first node and a second measurement associated with a second node, responsive to the obtaining, detecting that the first measurement is less than a first threshold and the second measurement is greater than a second threshold, responsive to the detecting, identifying an application executed by the user equipment in obtaining the service, and responsive to determining that the application requires dual connectivity based on the identifying, commanding the user equipment to establish connectivity with the second node or a third node to provide the service. Computing device 600 can facilitate in whole or in part identifying a first preference level of a first processing system to serve as an anchor node, receiving a first message from a second processing system, wherein the first message includes a second preference level of the second processing system to serve as the anchor node, determining that an application executed by a communication device in receiving a service would benefit from dual connectivity with respect to a plurality of networks in an amount that is greater than a threshold, and responsive to the determining, enabling dual connectivity on the communication device such that the communication device is simultaneously connected to: one of the first processing system or the second processing system, and a third processing system, wherein the first processing system and the second processing system are associated with a first network of the plurality of networks, and wherein the third processing system is associated with a second network of the plurality of networks. Computing device 600 can facilitate in whole or in part receiving, by a first processing system, a request for a service from a communication device to facilitate a communication session, receiving, by the first processing system, a measurement associated with a transmission by the first processing system, wherein the transmission facilitates the communication session via a first network, responsive to the receiving of the measurement, comparing, by the first processing system, a first preference level and a second preference level, wherein the first preference level indicates a preference of the first processing system to serve as an anchor node, wherein the second preference level indicates a preference of a second processing system to serve as the anchor node, and wherein the second preference level is different from the first preference level, and responsive to the comparing: causing, by the first processing system, the second processing system to serve as the anchor node during the communication session when the second preference level and the first preference level indicate that the second processing system is preferred as the anchor node, such that a first portion of the service is facilitated by the second processing system via the first network, and causing, by the first processing system, the first processing system to serve as the anchor node during the communication session when the second preference level and the first preference level indicate that the first processing system is preferred as the anchor node, such that the first portion of the service is facilitated by the first processing system via the first network.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
determining that an application executed by a communication device in obtaining a service requires dual connectivity, the dual connectivity including simultaneous connection to a first communication node and a selected communication node; and
responsive to the determining, commanding the communication device to establish connectivity with the selected communication node to provide at least a portion of the service, the selected communication node corresponding to only one of a second communication node and a third communication node,
wherein the second communication node is the selected communication node when a first preference value associated with the second communication node is greater than a second preference value associated with the third communication node, and wherein the third communication node is the selected communication node when the second preference value is greater than the first preference value, wherein the second preference value is based on an amount of load accommodated by the third communication node, an uplink capacity associated with the third communication node, a downlink capacity associated with the third communication node, an amount of available communication frequency bands associated with the third communication node, and an amount of transmission power that the third communication node has to communicate with communication device.

2. The device of claim 1, wherein the first communication node and the second communication node are associated with a first network.

3. The device of claim 2, wherein the commanding of the communication device to establish connectivity with the selected communication node comprises commanding the communication device to establish connectivity with the second communication node.

4. The device of claim 3, wherein the second communication node serves as an anchor node with respect to the communication device responsive to the commanding of the communication device to establish connectivity with the second communication node, and wherein the third communication node is associated with a second network that is different from the first network.

5. The device of claim 1, wherein the first communication node is associated with a first network and the third communication node is associated with a second network that is different from the first network, and wherein the commanding of the communication device to establish connectivity with the selected communication node comprises commanding the communication device to establish connectivity with the third communication node.

6. The device of claim 5, wherein the third communication node serves as an anchor node with respect to the communication device responsive to the commanding of the communication device to establish connectivity with the third communication node.

7. The device of claim 5, wherein the first network comprises a 5G network.

8. The device of claim 7, wherein the second network comprises a 4G network or an LTE network.

9. The device of claim 1, wherein the service is requested by the communication device via a request, and wherein the request comprises an identification of a type of a communication session requested by the communication device.

10. A non-transitory machine-readable medium, comprising executable instructions that, when executed by a first processing system including a first processor, facilitate performance of operations, the operations comprising:
identifying a first preference level of the first processing system to serve as an anchor node;
identifying a second preference level of a second processing system including a second processor to serve as the anchor node, wherein the second preference level is based on an amount of load accommodated by the second processing system, an uplink capacity associated with the second processing system, a downlink capacity associated with the second processing system, an amount of available communication frequency bands associated with the second processing system, and an amount of transmission power that the second processing system has to communicate with a communication device;
responsive to a determination that an application executed by the communication device in receiving a service would benefit from dual connectivity with respect to a plurality of networks, selecting only one of a third processing system including a third processor and a fourth processing system including a fourth processor in accordance with a third preference level associated with the third processing system and a fourth preference level associated with the fourth processing system, resulting in a selected processing system; and
based on the determination, enabling the dual connectivity on the communication device such that the communication device is simultaneously connected to:
one of the first processing system or the second processing system; and
the selected processing system,
wherein the first processing system and the second processing system are associated with a first network of the plurality of networks, and wherein the third processing system and the fourth processing system are associated with a second network of the plurality of networks.

11. The non-transitory machine-readable medium of claim 10, wherein the first network comprises a 5G network and the second network comprises a 4G network or an LTE network.

12. The non-transitory machine-readable medium of claim 10, wherein the operations further comprise:
determining that the first processing system is preferred as the anchor node relative to the second processing system based on a comparison of the first preference level and the second preference level,
wherein the enabling of the dual connectivity on the communication device causes the communication device to be simultaneously connected to the first processing system and the selected processing system based on the determining that the first processing system is preferred as the anchor node relative to the second processing system.

13. The non-transitory machine-readable medium of claim 10, wherein the operations further comprise:
determining that the second processing system is preferred as the anchor node relative to the first processing system based on a comparison of the first preference level and the second preference level; and
responsive to the determining that the second processing system is preferred as the anchor node relative to the first processing system, initiating a handover of at least a portion of the service from the first processing system to the second processing system.

14. The non-transitory machine-readable medium of claim 10, wherein the operations further comprise:
determining that the first preference level indicates that the first processing system does not prefer to serve as the anchor node;
responsive to the determining that the first preference level indicates that the first processing system does not prefer to serve as the anchor node, determining that the second preference level indicates that the second processing system does not prefer to serve as the anchor node; and
responsive to the determining that the second preference level indicates that the second processing system does not prefer to serve as the anchor node, initiating a handover of at least a portion of the service from the first processing system to the selected processing system such that the selected processing system serves as the anchor node.

15. The non-transitory machine-readable medium of claim 10, wherein the operations further comprise:
obtaining at least one measurement associated with a downlink communication between the communication device and the first processing system, an uplink communication between the communication device and the first processing system, or a combination thereof; and
determining that the at least one measurement has a value that is less than a threshold,
wherein the determining that the application executed by the communication device in receiving the service would benefit from the dual connectivity with respect to the plurality of networks is responsive to the determining that the at least one measurement has the value that is less than the threshold.

16. A method, comprising:
receiving, by a first processing system including a first processor, a request for a service from a communication device;
obtaining, by the first processing system, a first preference level, wherein the first preference level indicates a preference of the first processing system to serve as an anchor node;
obtaining, by the first processing system and from a second processing system, a second preference level that is different from the first preference level, wherein the second preference level indicates a preference of the second processing system to serve as the anchor node;
comparing, by the first processing system, the first preference level and the second preference level, wherein the second preference level is based on an amount of load accommodated by the second processing system, an uplink capacity associated with the second processing system, a downlink capacity associated with the second processing system, an amount of available communication frequency bands associated with the second processing system, and an amount of transmission power that the second processing system has to communicate with the communication device;
responsive to the comparing:
causing, by the first processing system, the second processing system to serve as the anchor node when the second preference level and the first preference level indicate that the second processing system is preferred as the anchor node, such that a first portion of the service is facilitated by the second processing system; and
causing, by the first processing system, the first processing system to serve as the anchor node when the second preference level and the first preference level indicate that the first processing system is preferred as the anchor node, such that the first portion of the service is facilitated by the first processing system;
selecting, by the first processing system, only one of a third processing system and a fourth processing system in accordance with a third preference level associated with the third processing system and a fourth preference level associated with the fourth processing system, resulting in a selected processing system; and
causing, by the first processing system, a second portion of the service to be facilitated by the selected processing system.

17. The method of claim 16, further comprising:
determining, by the first processing system, that the communication device would benefit from dual connectivity in an amount that is greater than a threshold; and
responsive to the determining that the communication device would benefit from the dual connectivity in the amount that is greater than the threshold, commanding, by the first processing system, the communication device to enable the dual connectivity such that the communication device connects to the selected processing system.

18. The method of claim 16,
wherein the obtaining of the second preference level comprises receiving the second preference level from the second processing system in a message transmitted by the second processing system.

19. The method of claim 16, wherein the first portion of the service is facilitated by a first network and the second portion of the service is facilitated by a second network.

20. The method of claim 19, wherein the first processing system selects the selected processing system based on a load accommodated by the third processing system and interference reported to the first processing system by the third processing system.

* * * * *